United States Patent [19]

Kieffer

[11] 3,808,363

[45] Apr. 30, 1974

[54] CONVERSATIONAL DATA TERMINAL HAVING A FUNCTION REPEAT CAPABILITY

[75] Inventor: John B. Kieffer, Riverton, Wyo.

[73] Assignee: Datel Corporation, McLean, Va.

[22] Filed: Dec. 23, 1970

[21] Appl. No.: 100,877

[52] U.S. Cl. ................. 178/17 C, 340/365, 197/98, 235/145

[51] Int. Cl. ............................................ H04l 15/06

[58] Field of Search......... 340/365; 179/17 R, 17 C, 179/17 A, 2 DP, 90 K; 197/98; 235/145, 146; 178/17.5

[56] References Cited

UNITED STATES PATENTS

| | | | |
|---|---|---|---|
| 3,624,292 | 11/1971 | Guzak | 179/2 DP |
| 3,614,315 | 10/1971 | Glorioso | 178/17 C |
| 3,466,647 | 9/1969 | Guzak | 178/17 R |
| 3,457,368 | 7/1969 | Houcke | 178/17 R |
| 3,603,982 | 9/1971 | Patti | 178/17 C |
| 3,576,569 | 4/1971 | Watson | 340/365 E |

*Primary Examiner*—Kathleen H. Claffy
*Assistant Examiner*—Thomas D'Amico

[57] ABSTRACT

Incorporated in a conversational data terminal is repeat logic circuitry, the operation of which is selectively controlled by the operation of a switch on the keyboard of the data terminal. The repeat logic circuitry functions when operated to cycle the data terminal so that a printer function or input entered through the keyboard is repeatedly outputted at the cycle rate of the data terminal.

3 Claims, 3 Drawing Figures

INVENTOR
JOHN B. KIEFFER
BY Reilly and Lewis
ATTORNEYS

CONVERSATIONAL DATA TERMINAL HAVING A FUNCTION REPEAT CAPABILITY

SPECIFICATION

The present invention relates to data terminals and more particularly to an improved conversational data terminal having a printer keyboard through which printer inputs or functions may be selectively entered into the data terminal.

In a conversational data terminal, conventionally the following printer functions may be selectively entered into the data terminal by actuating appropriate ones of the printer keys on its printer keyboard: graphics, such as letters, numerals, punctuation marks and other selected symbols; and printer operational functions, such as, space, backspace, index, tab and carrier return. These printer functions once entered are outputted in a conventional manner. For example, when the data terminal is "off-line", i.e., not transmitting to external equipment, generally the data terminal simply prints out the entered printer functions. In the case where the data terminal is "on-line," the data terminal then transmits the entered printer functions to external equipment, such as, remote data terminals.

Heretofore, it has been necessary to repeat the entry of a printer function at the printer keyboard in order to repeatedly output the printer function. The printer function to be repeated was entered by repeatedly actuating the appropriate printer key on the printer keyboard and such repeated actuation is very time-consuming particularly in those cases where it is frequently necessary to repeat the outputting of the same printer function, e.g., a line of characters or spaces, etc.

It is, accordingly, an object of the present invention to provide an improved conversational data terminal characterized by having a function repeat capability or mode of operation which is operable in its function repeat mode to automatically and repeatedly output an entered printer function thereby to obviate the aforementioned disadvantages associated with prior art conversational data terminals.

It is, further, an object of the present invention to provide novel logic circuitry for incorporation into a conversational data terminal which is selectively operable to control the data terminal so that it automatically repeats the outputting of a printer function entered through the data terminal keyboard.

In accomplishing the above and other objects, advantages and features there has been devised in an exemplary conversational data terminal, such as the Datel Model 30 terminal manufactured by Datel Corporation, novel logic circuitry in accordance with the present invention. The operation of the novel design logic circuitry is selectively controlled by means of a "repeat" button or switch located on the printer keyboard of the data terminal, and the logic circuitry operates to cycle the data terminal whenever the repeat switch is actuated so that a printer function entered through the printer keyboard is repeatedly outputted at the cycle rate of the data terminal's output mechanism and circuitry. Thus, there has been provided an improved conversational data terminal having a function repeat capability or mode of operation provided by novel logic circuitry which is operable in its function repeat mode to automatically and repeatedly output an entered printer function.

The above and other objects, advantages and features of the present invention will become more readily appreciated and understood from a consideration of the following detailed description when taken together with the accompanying drawings, in which.

Figure 1:
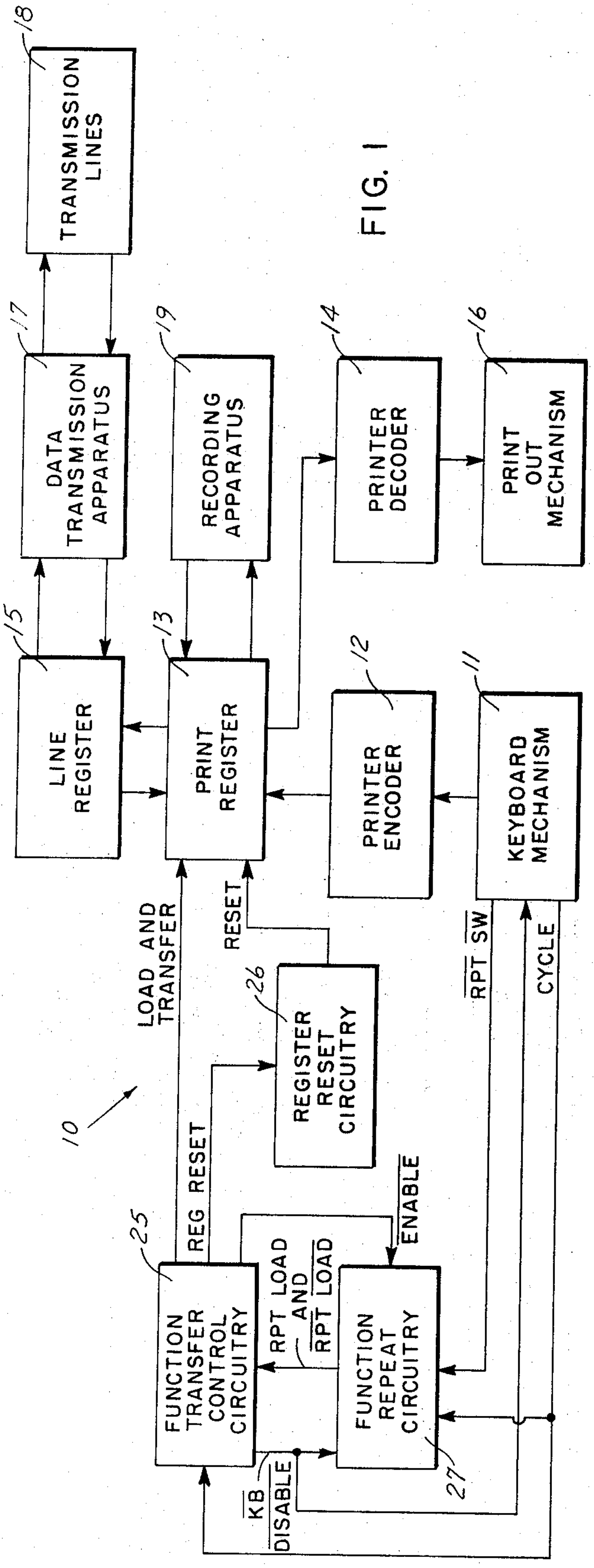
FIG. 1 is a block diagram of a conversational data terminal apparatus arranged according to the present invention to include a preferred form of function repeat mode of operation.

Referring to the drawings in more detail, there is shown in FIG. 1 a block diagram of an exemplary conversational data terminal 10. The data terminal 10 has a printer keyboard mechanism 11 which includes conventional keys for entering printer inputs. Each printer key is selectively actuatable so that by activating the appropriate printer key on the keyboard printer a selected printer input may be entered into the data terminal 10. For the purpose of illustration, the following printer inputs may be selectively entered into the data terminal 10 by activating the appropriate printer key: selected graphic information, such as, the letters of the alphabet, various numerals, punctuation marks and any other desired graphic symbols; and selected printer operational functions including space, backspace, index, tab and carrier return. Additionally included in the keyboard mechanism 11 are various control switches including a function repeat switch which is biased in a normally open position and a conventional printer on-off switch. As is hereinafter explained, actuation or closure of the function repeat switch causes an entered printer function to be repeatedly outputted as long as the repeat switch is held closed.

When the data terminal 10 is "off-line", e.g., not transmitting to external equipment, the keyboard mechanism 11 executes keyboard or printer inputs through mechanical means identical to the conventional mechanism employed in a standard IBM office typewriter. However, when the data terminal 10 has its function repeat switch closed so as to be placed in the repeat mode of operation or whenever the data terminal 10 is operating "on-line," each printer input entered into the keyboard mechanism 11 is transmitted to a printer encoder 12, as shown in FIG. 1. The printer encoder 12 is conventional in construction and functions to code each printer input received from the keyboard mechanism 11 into an appropriate form, such as, into bits of binary coded data. The encoded printer input is transmitted from the printer encoder 12 and loaded into a conventional print register 13 which functions to store the encoded printer input until it is reset; and on command the register 13 may output information by transferring it either to a printer decoder 14, a line register 15, or both. When the data terminal 10 is operating off-line in its repeat mode, the encoded printer input is transferred from the print register 13 to the printer decoder 14. The decoder 14 is conventional in operation and construction and functions to decode the printer input stored in the register 13 and to transfer the decoded information to conventional print out mechanism 16. The print out mechanism 16 then functions to output the entered printer input by printing out graphic information or by driving appropriate mechanism to perform the selected printer operational function, such as, space, backspace, etc.

When the data terminal 10 is operating on-line to transmit data, the encoded printer input is transferred in parallel from the print register 13 to the line register 15. The information is then outputted by being serially shifted in a conventional manner out of the line register 15 to a data transmission apparatus 17. The transmission apparatus 17 is conventional in construction and may be data transmission apparatus comprised of modulating and demodulating circuitry as described in assignee's U. S. application for Pat. Ser. No. 128,308 filed Mar. 11, 1971, now Pat. No. 3,673,787. The transmission apparatus 17 transmits the data received from the line register 15 over transmission lines 18, such as, telephone lines, to a remote data terminal apparatus (not shown). It is noted that at the same time data is being transferred fron the printer register 13 to the line register 15 for transmission to a remote data terminal that the data terminal apparatus 10 may be arranged so that this data is simultaneously being transmitted from the print register 13 to the printer decoder 14 for outputting by the print out mechanism 16.

The data terminal 10 may also be operated on-line to receive data from a remote data terminal over the transmission lines 18. The received data is in this case shifted serially into the line register 15 by the data transmission apparatus 17 then transferred in parallel from the line register 15 to the printer register 13. From the printer register 13, the received data is decoded by the decoder 14 and outputted by the print out mechanism 16. It is noted that recording apparatus 19, such as, the Model 80 Tape Deck manufactured by Datel Corporation, may be connected to the print register 13 to record the data transferred in and out of the register 13. The recording apparatus 19 further may be arranged to selectively record all transfers of encoded printer inputs in and out of the print register 13 or to record data only at certain times, for example, when the data terminal 10 is operating on-line.

Included in the data terminal 10 shown in FIG. 1 is a conventional function transfer control circuitry 25, conventional register reset circuitry 26 and novel function repeat circuitry 27. These circuits 25–27 function to control the loading of information into the printer register 13, the outputting of printer inputs or functions from the register 13 and the resetting of the register 13. The control circuitry 25 is connected to the keyboard mechanism 11 to receive control signals, collectively designated CYCLE, which collectively drive the control circuitry 25 so that is cycles in a conventional manner to load information entered at the keyboard 11 into the register 13 and then outputs this information in a conventional manner through the decoder 14, the line register 15 or both. The CYCLE control signal is generated by the keyboard mechanism 11 whenever the data terminal is turned on and ready for operation and indicates that a printer input has just been entered into the keyboard mechanism 11 by the selective actuation of a printer key. The control circuitry 25, in a normal cycle of the data terminal 10, generates a control signal collectively designated LOAD and TRANSFER which control the operation of the print register 13 so that it loads in the entered printer function or input which has been encoded by the encoder 12 and then outputs the printer function via either the line register 15, the decoder 14, or both. Additionally, the control circuitry 25 selectively generates a logic low $\overline{\text{KB DISABLE}}$ signal which is transmitted to the keyboard mechanism 11 and the repeat circuitry 27 to cause inputs entered at the keyboard during the time $\overline{\text{KB DISABLE}}$ is low to be ignored by the data terminal's logic circuitry. The control circuitry 25 also generates control signals collectively designated REG RESET which cause the printer register 13 to be reset when the next character input which is recognized by the data terminal's logic circuitry is entered. The reset circuitry 26 resets the register 13 by generating a control signal or signals collectively designated RESET.

The function repeat circuitry 27 is connected to the keyboard mechanism 11 to receive at least certain ones of the control signals collectively designated CYCLE and a $\overline{\text{RPT SW}}$ signal which when low indicates that the function repeat switch has been closed. The repeat circuitry 27 is enabled by the CYCLE signals and functions in response to the $\overline{\text{RPT SW}}$ signal to generate RPT LOAD and $\overline{\text{RPT LOAD}}$ signals which are transmitted to the control circuitry 25 and function to recycle the circuitry 25 so that the TRANSFER control signals are repeatedly transmitted to the register 13 and information loaded in the register 13 which represents the entered printer function is repeatedly outputted from the register 13. It is noted that when the repeat switch on the keyboard 11 is closed the reset circuitry 26 does not generate the RESET signal so that the register 13 cannot be reset while the function repeat switch is closed. In this manner, the register 13 holds the printer input entered at the time the function repeat switch is closed so that this printer input is repeatedly outputted by the cycling of the control circuitry 25. The circuit 25 transmits an $\overline{\text{ENABLE}}$ signal to the repeat circuitry 27 which goes high after or at the end of each cycle of the control circuitry 25 which, as is hereinafter explained, causes the circuit 27 to again output a RPT LOAD signal, thereby to recycle the control circuitry 25.

It is here noted that the exemplary data terminal 10 just described is preferably a modified form of the Datel Model 30 Conversational Data Terminal manufactured by Datel Corporation in which the mechanism and circuitry designated 11–15 and 25–26 are employed and into which has been incorporated the novel function repeat circuitry designated 27. The novel repeat logic circuitry 27 is shown in detail in FIG. 2.

Figure 2:
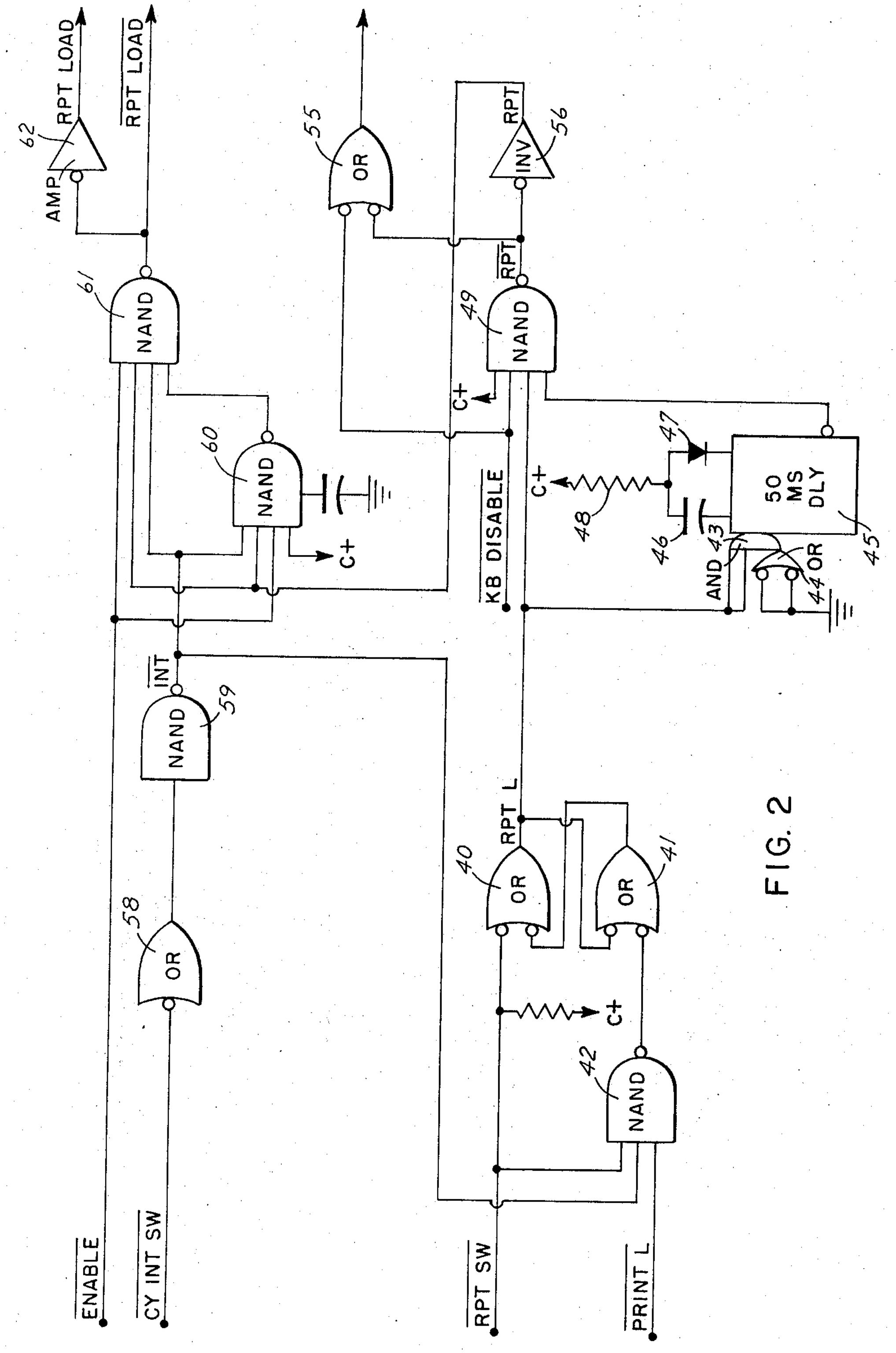
FIG. 2 is a somewhat schematic diagram of the logic circuitry incorporated in data terminal apparatus of FIG. 1 which is associated with its function repeat mode of operation.

Referring to FIG. 2, there is shown a pair of OR gates 40 and 41 connected to form a loop latch called the repeat latch "RPT L". Each input terminal of the gates 40 and 41 has a signal inverter connected thereto for inverting the electrical signals applied. The latch input at the gate 40 is connected to the function repeat switch to receive the signal $\overline{\text{RPT SW}}$ and also is connected to C+ voltage, or a logic high. Accordingly, the repeat latch is latched to generate a logic high, designated RPT L, on the output of the gate 40 whenever the function repeat switch is closed to apply the logic low signal $\overline{\text{RPT SW}}$ to the latch input of the gate 40. Connected to the latch input of the gate 41 is the output of a NAND gate 42. The gate 42 has three inputs connected to receive the inputs $\overline{\text{RPT SW}}$, $\overline{\text{INT}}$ and PRINT L. The input $\overline{\text{PRINT L}}$, i.e., print latch, functions to gate the contents of the printer register 13 to the decoder 14 when it is desired to trigger a print cycle and the signal $\overline{\text{INT}}$, i.e., interlock, is caused by switch closures in the printer of the data terminal 10 which indicates that a print cycle is being executed.

The output of the repeat latch from the gate 40 is connected to one input of the NAND gate 49 and commonly to two inputs of an AND gate 43. The other input of the gate 43 is connected to the output of an OR gate 44. The gate 44 has signal inverters connected on both its inputs and ground or logic low is applied through the signal inverters to both inputs of the gate 44. The output of the gate 43 is connected to a time delay circuit in the form of one shot 45 with a capacitor 46 and appropriately biased diode 47 parallel-connected between the one shot 45 and one terminal of a resistor 48. The other end of the resistor 48 has C+ voltage applied thereto. The output of the one shot 45 has a signal inverter connected thereto and is connected to another input of the AND gate 49 and of the remaining inputs of the gate 49 one receives C+ voltage and the other receives the aforementioned signal $\overline{\text{KB DISABLE}}$ which, when low, causes the data terminal's logic circuitry to ignore keyboard inputs.

A signal inverter is connected on the output of the gate 49 and its output is connected to one input of the double input OR gate 55. The other input of the gate 55 is connected to receive the $\overline{\text{KB DISABLE}}$ signal. Both inputs of the gate 55 have signal inverters connected thereto and the output signal generated on the output of the gate 55 functions to enable a print set one shot (not shown). The output of the gate 49 is also connected to a signal inverting amplifier 56 to generate on the output of the inverter (INV) 56 and a signal designated RPT. An OR gate 58 having a signal inverter connected on its single input receives as an input the signal $\overline{\text{CY INT SW}}$. The signal $\overline{\text{CY INT SW}}$ is generated by a switch in the printer of the data terminal 10 and indicates that a print cycle is being executed. The output of the gate 58 is connected to the input of the NAND gate 59 so that the aforementioned $\overline{\text{INT}}$ signal is generated on the output of the gate 59 and this output is connected to one input of the gate 42 to supply the signal $\overline{\text{INT}}$ thereto.

The output of the gate 59 is also connected to one input of NAND gates 60 and 61. Each of the gates 60 and 61 has four inputs, and the gate 60 has a grounded capacitor connected thereto to provide a brief time delay of predetermined duration. One of the inputs of each of the gates 60 and 61 is connected to receive the signal $\overline{\text{ENABLE}}$, and another input of each of the gates 60 and 61 is connected to the output of the amplifier 56. The remaining input of the gate 60 is connected to C+ voltage and the output of the gate 60 is connected to the fourth input of the gate 61. The output signal designated $\overline{\text{RPT LOAD}}$ is generated on the output of the gate 61 and is transmitted therefrom to the control circuitry 25. The input of an inverting amplifier 62 is connected to the output of the gate 61 whereby the output signal RPT LOAD is generated on the output of the amplifier 62 and is transmitted therefrom to the control circuitry 25.

Assuming that a printer switch has just been closed on the keyboard mechanism 11, the function repeat switch may be selectively closed to place the data terminal on its repeat mode of operation. With the repeat switch closed, the logic low signal $\overline{\text{RPT SW}}$ is generated and applied to the input of the gate 40 to set the repeat latch so that a logic high RPT L is generated on the repeat latch output. The logic high RPT L is "anded" with the signal $\overline{\text{KB DISABLE}}$ and the logic high signal RPT L delayed by approximately 50 milliseconds. The delayed logic high RPT L is generated by a delay circuit made up of the flip-flop 45. A time delay of approximately 50 milliseconds is provided to prevent the data terminal 10 from going into the function repeat mode of operation because of an accidental momentary closure of the function repeat switch and to allow the data terminal 10 to finish any uncompleted operations. The $\overline{\text{KB DISABLE}}$ signal is generated, as before-mentioned, by the control circuitry 25 and is transmitted to the repeat circuitry 27 as a control signal. When the keyboard mechanism is not disabled and thus is operable, the $\overline{\text{KB DISABLE}}$ signal is high. Thus, the NAND gate 42 generates the logic low output $\overline{\text{RPT}}$ whenever the repeat latch is set and the keyboard mechanism 11 is not disabled.

The logic low $\overline{\text{RPT}}$ is inverted by the amplifier 56 to generate the resulting logic high RPT. The OR gate 58 generates a logic low output whenever a logic high $\overline{\text{CY INT SW}}$ signal is generated and the $\overline{\text{CY INT SW}}$ indicates, when high, that the data terminal 10 is not executing a print cycle. With the data terminal 10 turned on and a print cycle not in progress, the input to the gate 59 is thus low and a logic high signal $\overline{\text{INT}}$ is generated in response thereto.

The logic high $\overline{\text{INT}}$ is applied to the AND gates 60 and 61 where it is "anded" with the logic high RPT and the signal $\overline{\text{ENABLE}}$. The signal $\overline{\text{ENABLE}}$ is generated by the control circuitry 25 and is high whenever the circuitry 25 has just completed transferring a coded input to the line register 15 on the restoring apparatus 19. It is noted that as a result of the short time delay built into the gate 60 that its output remains high a short time after the signals $\overline{\text{ENABLE}}$, $\overline{\text{INT}}$ and RPT all go high. Thus the gate 61 has four high inputs and generate an output pulse $\overline{\text{RPT LOAD}}$ which is a logic low. The width of pulse $\overline{\text{RPT LOAD}}$ is equal to the time delay associated with the gate 60, since once the gate 60 generates its logic low output in response to its four high inputs of the C+ voltage and the logic high pulses $\overline{\text{ENABLE}}$, RPT and $\overline{\text{INT}}$, the gate 61 will then generate a logic high output.

The output logic low pulse $\overline{\text{RPT LOAD}}$ is inverted by the amplifier 62 to generate a corresponding RPT LOAD logic high pulse and these pulses $\overline{\text{RPT LOAD}}$ and RPT LOAD are transmitted to the transfer control circuitry 25 to cause a TRANSFER pulse to be generated to cause the printer function stored in the printer register 15 to be outputted. Once the circuitry 15 begins to cycle, the $\overline{\text{ENABLE}}$ pulse which it generates goes low so that the gate 60 output again goes high. Once the print register 13 has outputted the information stored therein, the control mechanism 25 will have completed its operation so that another set of pulses $\overline{\text{RPT LOAD}}$ and RPT LOAD will be generated and transmitted to the circuitry 25, provided the data terminal is still ready to operate as indicated by the $\overline{\text{INT}}$ signal being high and the function repeat switch is closed as indicated by the RPT signal being high. The printer input stored in the register 13 is then again outputted by the cycling of the control circuitry 25. Thus, the data terminal 10 is operable to repeatedly output the printer function stored in the register 13 at its cycle rate as long as the function repeat switch is held closed and the data terminal is in operable condition as indicated by the signals $\overline{\text{KB DISABLE}}$ and $\overline{\text{CY INT SW}}$. In the preferred form of data terminal 10 which is a modified form of Datel Model 30 Data Terminal, the data terminal's output or cycle rate is 15 characters per second.

After the entered printer input has been outputted a desired number of times, the repeat switch is released to return to its normally open position. The signal $\overline{\text{RPT SW}}$ then goes high so that a logic high is applied to the NAND gate 42. The signal $\overline{\text{INT}}$ applied to the gate 42 goes high at the end of a print cycle and these two highs are "nanded" with the signal $\overline{\text{PRINT L}}$. The $\overline{\text{PRINT L}}$ signal is generated by logic associated with a print latch (not shown) which is set at the beginning of each data terminal cycle to enable the printer decoder 14 to drive solenoids in the printer of the data terminal 10 and start the print cycle. The signal $\overline{\text{PRINT L}}$ goes high after a printer input has been outputted. Thus, with the repeat switch now open, the gate 42 has three high inputs, and a logic low output is generated which unlatches the repeat latch so that a logic low signal is locked on the output of the gate 40. A logic high is then generated on the output of the gate 49 which is supplied to the INV 56 so that its output goes low. Thereby, the operation of the NAND gates 60 and 61 is disabled. Further, the logic high output is supplied to the OR gate 55. It is noted that since the keyboard mechanism is not disabled that $\overline{\text{KB DISABLE}}$, as before mentioned, is high so that two highs are supplied to the gate 55 so that a logic low output is generated on the gate 55 and supplied to the print set one shot.

Figure 3:
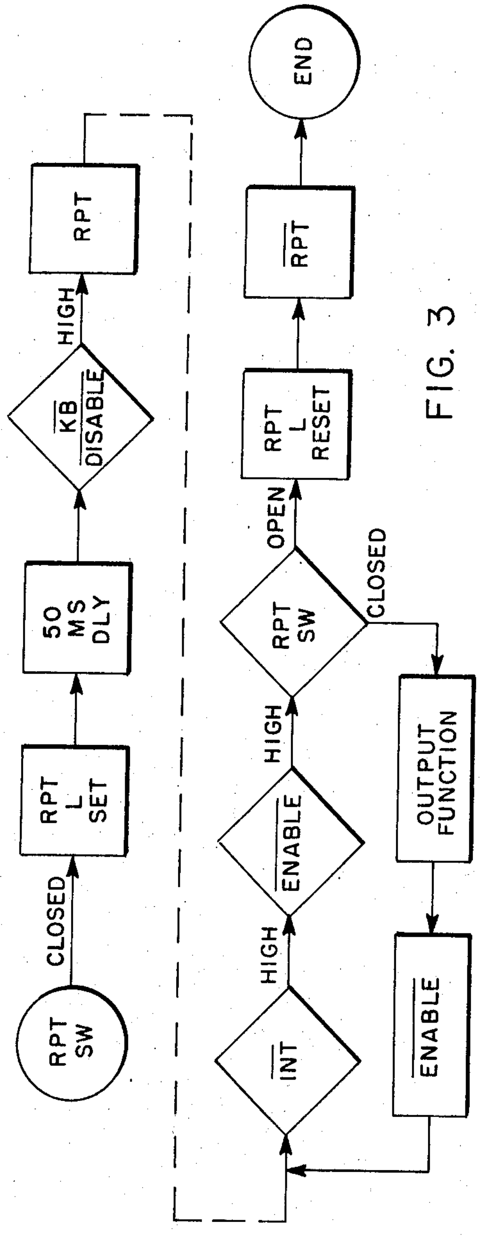
FIG. 3 is a functional flow diagram which illustrates the operation of the data terminal apparatus of FIG. 1 in its function repeat mode of operation.

Thus, there has been provided an improved conversational data terminal having a function repeat capability or mode of operation provided by novel logic circuitry which is operable in its function repeat mode to automatically and repeatedly output an entered printer function. The exemplary data terminal functions, as illustrated in FIG. 3, to transmit a signal to set the repeat latch (RPT L SET) once the repeat switch (RPT SW) is closed. The output of the repeat latch is delayed fifty milliseconds and converted to the output signal RPT if the keyboard mechanism is not disabled (KB DISABLE). A pulse output is then generated to cycle the data terminal so that an entered printer function is outputted (OUTPUT FUNCTION) if the RPT, $\overline{\text{INT}}$ and $\overline{\text{ENABLE}}$ signals are all logic highs, and the repeat switch (RPT SW) is closed. Once the repeat switch (RPT SW) is opened and the print cycle is complete, the repeat latch is reset (RPT L RESET) and the output signal RPT goes low to become $\overline{\text{RPT}}$ so that the repeat mode of operation of the data terminal 10 ends.

It is therefore to be understood from the foregoing description of a preferred form of the present invention that various modifications and changes may be made in the specific design, construction and arrangement of circuitry and mechanism without departing from the spirit and scope of the present invention.

What is claimed is:

1. In a conversational data terminal:

keyboard means including printer keys which are selectively operable to enter a printer input, cycle control generating means for generating a cycle control signal each time that a printer input is entered, and repeat switch means selectively operable for generating a repeat signal;

print register means for storing received data representing each printer input, said print register means being operable to store data, until reset, and being responsive to each cycle control signal to output the stored data;

encoder means connected to receive a printer input entered in said keyboard means and being operable to encode the printer input and transfer the coded data representing the printer input into said print register means;

selectively operable control circuit means operative in response to each cycle control signal generated for generating a load and transfer control signal to operate said print register means whereby said print register means outputs the coded data received from said encoder means in response to each cycle control signal applied, and reset signal generating means associated with said control circuit means for generating a reset control signal to reset said print register in response to each next printer input entered in said keyboard means;

selectively operable repeat circuit means including a repeat latch operative in response to a cycle control signal and repeat signal from said keyboard means for recycling said control circuit means without resetting said print register means whereby said control circuit means generates said load and transfer control signals at the cycle rate of the terminal so that said print register means repeatedly outputs the same stored data at the cycle rate as long as said print register means is recycled by said repeat circuit means; and said control circuit means generating an enable signal at the end of each cycle of said control circuit means for enabling said repeat circuit means to apply a repeat signal to recycle said control circuit means as long as a cycle control signal and repeat signal are received from said keyboard means.

2. The invention recited in claim 1, said repeat circuit means including a logic latching means triggered to ON condition by operation of repeat switch means and triggered to OFF condition after said repeat circuit selection means is released and the end of the print cycle is reached.

3. The invention recited in claim 1 wherein said repeat latch includes delay circuit means connected between said repeat switch means and said repeat circuit means for preventing the operation of said repeat circuit means until said repeat switch means has been actuated for a predetermined period of time.

* * * * *

PO-1050
(5/69)

UNITED STATES PATENT OFFICE
CERTIFICATE OF CORRECTION

Patent No. 3,808,363 Dated 30 April 1974

Inventor(s) John B. Kieffer

It is certified that error appears in the above-identified patent and that said Letters Patent are hereby corrected as shown below:

In the Specification:

Column 1, line 60, cancel the repeat switch and insert --the "repeat" switch--

Column 2, line 63, cancel operating off-line in and insert --operating "off-line" in--

Column 3, line 7, cancel operating on-line to and insert --operating "on-line" to--
line 14, cancel "be data" and insert --be a data--
line 28, cancel operated on-line to and insert --operated "on-line" to--
line 44, cancel operating on-line and insert --operating "on-line"--
line 55, cancel "is" and insert --it--

Signed and sealed this 22nd day of October 1974.

(SEAL)
Attest:

McCOY M. GIBSON JR.
Attesting Officer

C. MARSHALL DANN
Commissioner of Patents